(12) United States Patent
Schönebeck

(10) Patent No.: US 7,097,234 B2
(45) Date of Patent: Aug. 29, 2006

(54) DEFORMATION ELEMENT, IN PARTICULAR FOR USE IN MOTOR VEHICLES

(75) Inventor: Horst Schönebeck, Gelnhausen (DE)

(73) Assignee: ArvinMeritor GmbH, (DE)

( * ) Notice: Subject to any disclaimer, the term of this patent is extended or adjusted under 35 U.S.C. 154(b) by 0 days.

(21) Appl. No.: 10/731,949

(22) Filed: Dec. 10, 2003

(65) Prior Publication Data

US 2004/0124622 A1    Jul. 1, 2004

Related U.S. Application Data

(63) Continuation of application No. 10/280,867, filed on Oct. 25, 2002.

(30) Foreign Application Priority Data

Nov. 7, 2001    (DE) ................... 101 54 593

(51) Int. Cl.
  B60R 21/04    (2006.01)
  F16F 7/12    (2006.01)
(52) U.S. Cl. .................. 296/187.03; 296/187.05; 296/153
(58) Field of Classification Search .......... 296/187.03, 296/187.05, 146.6, 152, 153, 187.01, 187.02, 296/187.09, 187.07; 293/102, 120, 109, 293/132, 133, 135, 136; 188/371
See application file for complete search history.

(56) References Cited

U.S. PATENT DOCUMENTS

| | | | | |
|---|---|---|---|---|
| 3,583,530 A | | 6/1971 | Venne | |
| 3,888,531 A | * | 6/1975 | Straza et al. ................. | 293/120 |
| 3,933,387 A | * | 1/1976 | Salloum et al. .............. | 293/120 |
| 3,938,841 A | * | 2/1976 | Glance et al. ............... | 293/120 |
| 4,325,574 A | * | 4/1982 | Umemoto et al. ........... | 293/120 |
| 4,386,799 A | * | 6/1983 | Molnar ....................... | 293/120 |
| 5,005,887 A | * | 4/1991 | Kelman ....................... | 293/120 |
| 5,114,198 A | * | 5/1992 | Yamashita et al. .......... | 293/120 |
| 5,573,272 A | * | 11/1996 | Teshima ..................... | 280/751 |
| 5,810,406 A | * | 9/1998 | Reid et al. .................. | 293/128 |
| 5,934,729 A | * | 8/1999 | Baack ........................ | 296/39.1 |
| 6,062,413 A | * | 5/2000 | Redmond .................... | 220/266 |
| 6,070,905 A | * | 6/2000 | Renault ...................... | 280/751 |
| 6,247,745 B1 | * | 6/2001 | Carroll et al. .............. | 188/371 |
| 6,315,339 B1 | * | 11/2001 | Devilliers et al. .......... | 293/132 |
| 6,357,819 B1 | * | 3/2002 | Yoshino ................. | 296/187.02 |
| 6,443,513 B1 | * | 9/2002 | Glance ....................... | 293/133 |

FOREIGN PATENT DOCUMENTS

| | | |
|---|---|---|
| DE | 26 33 403 A1 | 2/1977 |
| DE | 44 26 291 A | 2/1996 |
| DE | 44 26 291 A1 | 2/1996 |
| DE | 2 232 836 A | 4/1999 |
| DE | 197 45 656 A1 | 4/1999 |

(Continued)

OTHER PUBLICATIONS

European Search Report, dated Nov. 25, 2003.

Primary Examiner—D. Glenn Dayoan
Assistant Examiner—Greg Blankenship
(74) Attorney, Agent, or Firm—Carlson, Gaskey & Olds

(57) ABSTRACT

A deformation element, in particular for use in motor vehicles, comprises a first base part and a second base part. The first base part includes at least one protrusion which tapers starting from the first base part The second base part includes at least one recess which tapers from a front side to a rear side thereof and is associated to the protrusion.

19 Claims, 2 Drawing Sheets

FOREIGN PATENT DOCUMENTS

| | | |
|---|---|---|
| EP | 0 024 078 B1 | 1/1983 |
| FR | 1 507 267 A | 12/1967 |
| FR | 2 729 621 A | 7/1996 |
| JP | 10 029470 A | 2/1998 |
| JP | 11 011239 A | 1/1999 |
| WO | WO 80 01829 | 9/1980 |

* cited by examiner

DEFORMATION ELEMENT, IN PARTICULAR FOR USE IN MOTOR VEHICLES

REFERENCE TO RELATED APPLICATIONS

The present invention is a continuation application of U.S. patent application No. 10/280,867, filed Oct. 25, 2002, which claims the benefit of German patent application No. 101 54 593.2, filed Nov. 7, 2001.

TECHNICAL FIELD

The invention relates to a deformation element, in particular for use in motor vehicles.

BACKGROUND OF THE INVENTION

Deformation elements are used in various parts of the vehicle body, for instance bumpers, interior linings etc., in order to convert kinetic energy into plastic deformation of the material of the deformation element. In this way the negative effects of a collision, for instance between the vehicle and an obstacle, or between a body part of the vehicle occupant and the interior lining of the vehicle, are to be reduced.

More particularly, there are known sheet-like deformation elements which in case of a collision have an effect across an as large a surface area as possible. It is a disadvantage here that the course of the deformation force as a function of the deformation path can be influenced only to an insufficient extent.

Therefore it is the object of the invention to provide a deformation element in which the graph of deformation force versus deformation path can be adapted to the respective requirements.

BRIEF SUMMARY OF THE INVENTION

According to the invention, a deformation element comprises a first base part and a second base part. The first base part includes at least one protrusion which tapers starting from the first base part. The second base part includes at least one recess which tapers from a front side to a rear side thereof and is associated to the protrusion. This deformation element is based on the basic idea to move two parts relative to each other for energy conversion, with the one part penetrating the other and plastic deformations occurring therewith. The graph of deformation force versus deformation path can be adjusted in a very easy manner by selecting the geometry of the protrusion of the first base part and of the recess in the second base part. This graph can also be influenced by the selection of the materials, of which the protrusion and the second base part are made of.

According to a preferred embodiment of the invention it is provided for that the protrusion has the shape of a truncated cone and that the recess likewise has the shape of a truncated cone. The conical shape offers the advantage that an automatic centering will occur between the two base parts. Moreover, by a suitable selection of the angle of taper the graph of deformation force versus deformation path can be adjusted as desired.

As an alternative to giving the protrusion and the recess the shape of a truncated cone, there could be used a configuration of a truncated pyramid or even an irregular shape.

It is preferably provided for that the side surface of the protrusion and the middle axis of the protrusion include a larger angle as the side surface of the recess and the middle axis of the recess. In this way there will be produced a superproportionally increasing deformation force during penetration of the protrusion into the recess, because the differences in cross-section of protrusion and recess become larger with an increasing deformation path.

It is likewise possible that the angle of taper of the protrusion and the recess varies. This will result in the further possibility to vary the course of the deformation force as a function of the deformation path.

The two base parts may be configured like a plate and comprise a plurality of protrusions and recesses, respectively. A sheet-like deformation element can be achieved in this way, which is able to make available a high deformation force. The deformation force along the base part may also change, for instance, it may be larger on the one half than on the other. This may be used—for the application case as an impact protection for the head of an occupant—to the effect that there is provided a higher deformation force for the probable contact region with the head of a tall and correspondingly heavy vehicle occupant than for a probable contact region with the head of a smaller vehicle occupant having a correspondingly lower weight.

According to the preferred embodiment of the invention it is provided for that the second base part is made of a material that is softer than the material of the protrusions. This allows an easily controllable deformation behavior.

Advantageous designs of the invention will be apparent from the subclaims.

DETAILED DESCRIPTION OF THE PREFERRED EMBODIMENTS

Figure 1:
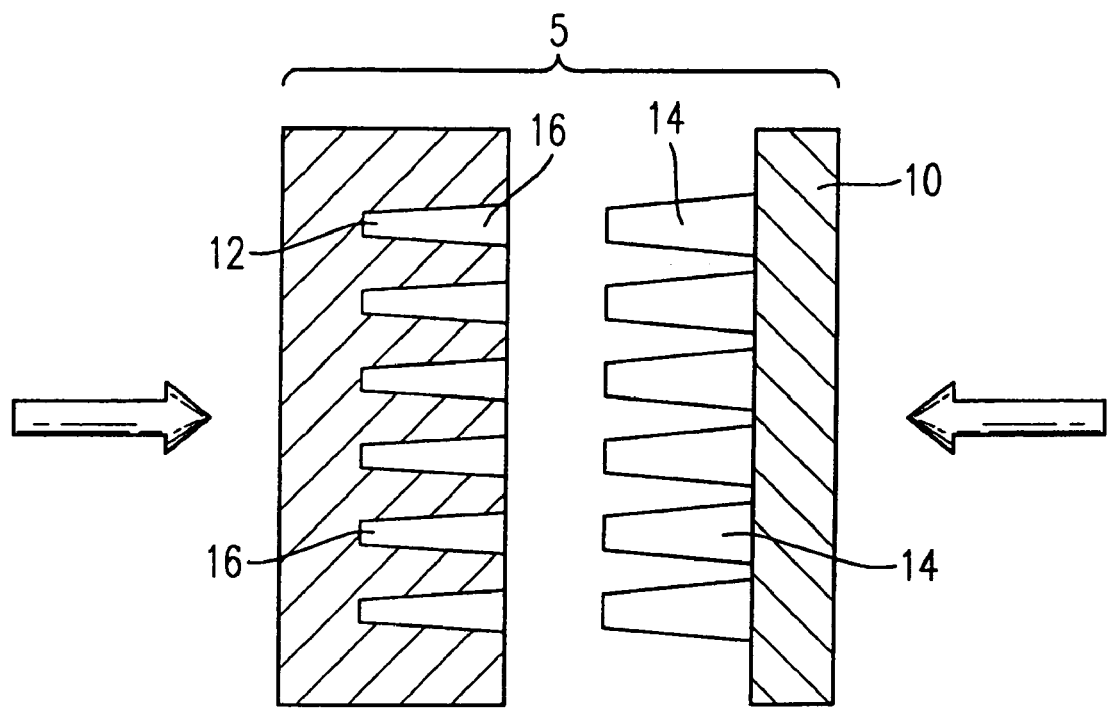
FIG. 1 shows in a schematic sectional view a deformation element according to the invention, in an initial state.

In FIG. 1 there can be seen a deformation element 5 which comprises a first base part 10 and a second base part 12. The first and second base parts are configured generally in the shape of a plate and may be arranged, for example, between a body part and a lining piece of the vehicle, or between the vehicle body and a bumper.

Figure 3:
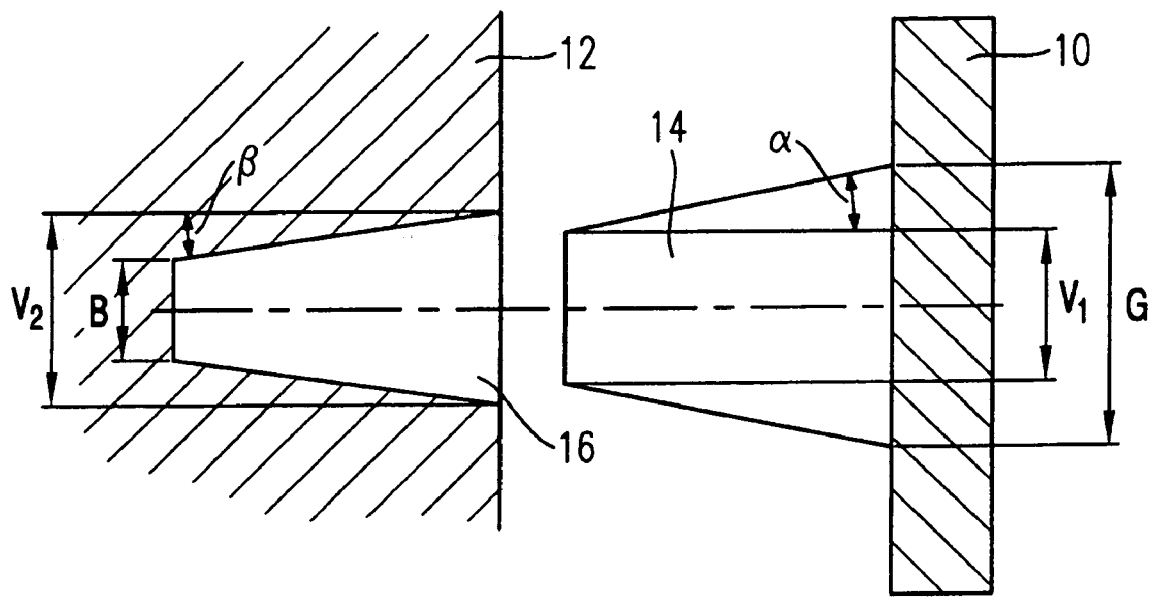
FIG. 3 shows in a schematic sectional view a protrusion and a recess of the deformation element in the initial state.

The first base part 10 is provided with a plurality of protrusions 14 in the shape of a truncated cone. Thus, they have a foot surface area G (see FIG. 3), a front face $V_1$ and an angle of taper α. Six neighboring protrusions are provided in the embodiment shown, but there may be used a greater or smaller number of protrusions depending on the respective requirements.

The second base part 12 has a plurality of recesses 16, with each of these recesses being associated to an opposing protrusion 14 of the first base part. The recesses 16 each have a front surface area $V_2$, a bottom area B as well as an angle of taper β.

The angle of taper a of the protrusion 14 is chosen so as to be larger than the angle of taper β of the recess 16.

Further, the front face $V_1$ of the protrusion 14 has a diameter smaller than that of the front surface area $V_2$ of the recess 16. In addition, the diameter of the bottom area B of the recess 16 is configured to be smaller than the diameter of the front face $V_1$ of the protrusion 14. Finally, the diameter of the foot surface area G of the protrusion 14 is larger than the diameter of the front surface area $V_2$ of the recess 16.

In the initial state the first base part 10 and the second base part 12 are arranged spaced from each other; this distance may be distinctly smaller than the one shown in FIG. 1. The first base part 10 can be arranged relative to the second base part 12 such that the front face $V_1$ of the protrusion 14 lies directly opposite the front surface area $V_2$ of the recess 16, or such that it already projects slightly into the recess 16. In view of a compact design, the protrusion will already project in the initial state into the recess to such an extent that the front surface area $V_2$ of the recess contacts the region of the protrusion with the same diameter.

Figure 2:
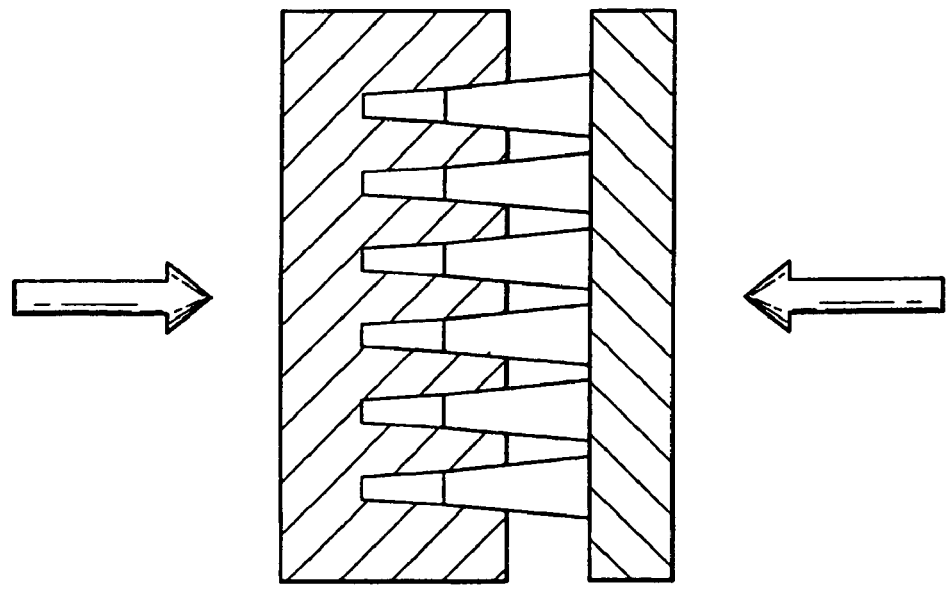
FIG. 2 shows the deformation element of FIG. 1 during the energy conversion.
Figure 4:
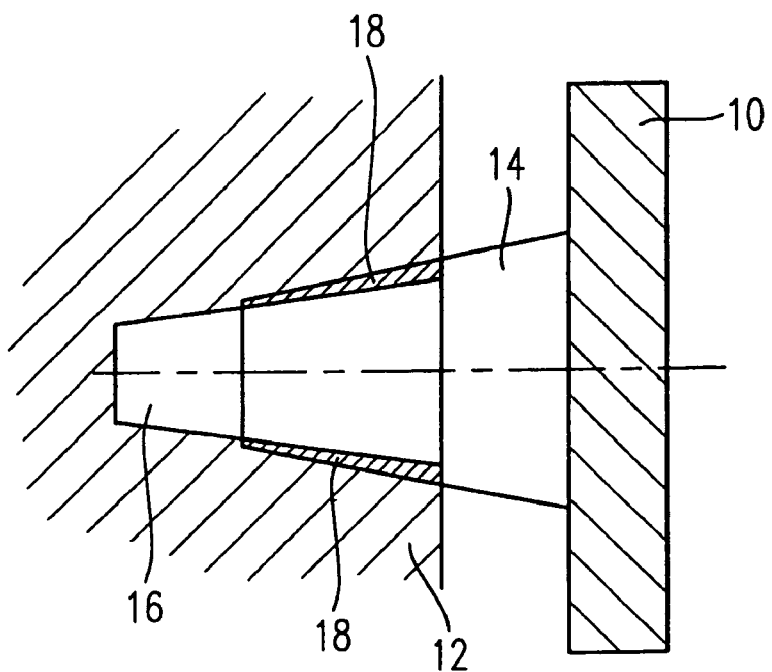
FIG. 4 shows in a schematic view the recess of FIG. 3 with the protrusion of FIG. 3 being superimposed.

If starting from the state shown in FIGS. 1 and 2 the two base parts are pushed into each other in the direction of the arrows of FIGS. 1 and 2, this will be possible without any effort until the outer surface area of the projection 14 rests on the inner surface area of the recess 16. The first contact is in the region of the front surface area $V_2$ of the recess 16, due to the specific geometry of the protrusion 14 and the recess 16 as well as due to the differing angles of taper. As this is a linear contact, the deformation force increases as from this linear contact comparably gentle and not abruptly. With a further relative movement between the first and second base parts, the deformation force will increase in a superproportional manner, as the difference in cross-section of the protrusion 14 and the recess 16 becomes larger and larger with an increasing penetration depth. This difference in cross-section is shown in FIG. 4 as a hatched area 18.

A foamed plastics material is a particularly suitable material for the deformation element, the material for the second base part 12 being engineered so as to be softer than the material of the protrusions 14. The first and second base part, respectively, may be configured as an integrated part of a foamed component of a vehicle, for instance as part of the inner lining of a vehicle roof or a vehicle door.

The invention claimed is:

1. A deformation element for use in motor vehicles comprising:
    a first base part having at least one tapered protrusion extending from said first base part; and
    a second base part comprised of a foamed plastics material and having at least one recess corresponding with said at least one tapered protrusion, said second base part being made of a material that is softer than a material of said at least one tapered protrusion, wherein said at least one recess tapers from a front side to a rear side thereof; and wherein said at least one tapered protrusion penetrates into said at least one recess against an increasing deformation force applied by said at least one recess to deform said at least one tapered protrusion and wherein said at least one tapered protrusion directly contacts an inner wall of said at least one recess.

2. The deformation element according to claim 1, wherein said at least one tapered protrusion has the shape of a truncated cone.

3. The deformation element according to claim 1, wherein said at least one tapered protrusion has the shape of a truncated pyramid.

4. The deformation element according to claim 1, wherein said at least one recess has the shape of a truncated cone.

5. The deformation element according to claim 1, wherein said at least one recess has the shape of a truncated pyramid.

6. The deformation element according to claim 1, wherein an angle between a side surface of said at least one tapered protrusion and a middle axis of said at least one tapered protrusion is larger than an angle between a side surface of said at least one recess and a middle axis of said at least one recess.

7. The deformation element according to claim 1, wherein an angle between a side surface of said at least one tapered protrusion and a middle axis of said at least one tapered protrusion varies to form an irregular shape.

8. The deformation element according to claim 1, wherein an angle between a side surface of said at least one recess and a middle axis of said at least one recess varies to form an irregular shape.

9. The deformation element according to claim 1, wherein a cross-section of a front face of said at least one tapered protrusion is smaller than a cross-section of a front surface area of said at least one recess.

10. The deformation element according to claim 1, wherein a cross-section of a foot surface area of said at least one tapered protrusion is larger than a cross-section of a front surface area of said at least one recess.

11. The deformation element according to claim 1, wherein said first and second base parts are each configured like a plate, wherein said at least one tapered protrusion comprises a plurality of protrusions and wherein said at least one recess comprises a plurality of recesses corresponding to said plurality of protrusions.

12. The deformation element according to claim 1, wherein said first base part is made of a foamed plastics material.

13. The deformation element according to claim 1, wherein one of said first and second base parts is adapted to be attached to a car body outer part.

14. The deformation element according to claim 1, wherein one of said first and second base parts is adapted to be attached to a lining piece for a vehicle interior space.

15. A deformation element for use in motor vehicles comprising:
    a first base part having a plurality of tapered protrusions, said first base part being formed from a first material; and
    a second base part having a plurality of tapered recesses aligned with said plurality of tapered protrusions, said second base part being formed from a second material that is softer than said first material, and wherein each one of said first and second base parts moves toward the other of said first and second base parts such that said plurality of tapered protrusions penetrates into said plurality of tapered recesses to control energy conversion by deforming said plurality of tapered protrusions within said plurality of tapered recesses and wherein each of said plurality of tapered protrusions directly contacts an inner wall of a corresponding one of said plurality of tapered recesses.

16. The deformation element according to claim 15 wherein said first material comprises a first foamed plastics material and said second material comprises a second foamed plastics material that is softer than said first foamed plastics material.

17. The deformation element according to claim 16 wherein each of said plurality of tapered protrusions includes a generally solid protrusion body that is received within a corresponding tapered recess and wherein each one of said first and second base parts moves towards the other of said first and second base parts during deformation such that said generally solid protrusion body is deformed against a wall defining said corresponding tapered recess.

18. A deformation element for use in motor vehicles comprising:
- a first base part having at least one tapered protrusion extending from said first base part; and
- a second base part having at least one recess corresponding with said at least one tapered protrusion, wherein said at least one recess tapers from a front side to a rear side thereof, wherein said at least one tapered protrusion penetrates into said at least one recess against an increasing deformation force applied by said at least one recess to deform said at least one tapered protrusion, wherein said at least one tapered protrusion directly contacts an inner wall of said at least one recess, and wherein an angle between a side surface of said at least one tapered protrusion and a middle axis of said at least one tapered protrusion is substantially the same as an angle between a side surface of said at least one recess and a middle axis of said at least one recess.

19. The deformation element according to claim 15 wherein said first base part comprises a solid base plate with said plurality of tapered protrusions extending outwardly from said solid base plate and wherein said second base part comprises a solid plate body with said plurality of tapered recesses extending into said solid plate body.

* * * * *

UNITED STATES PATENT AND TRADEMARK OFFICE
CERTIFICATE OF CORRECTION

PATENT NO. : 7,097,234 B2  Page 1 of 1
APPLICATION NO. : 10/731949
DATED : August 29, 2006
INVENTOR(S) : Schonebeck It is certified that error appears in the above-identified patent and that said Letters Patent is hereby corrected as shown below:

Column 4, line 9: "clement" should be --element--

Signed and Sealed this

Twenty-first Day of November, 2006

JON W. DUDAS
*Director of the United States Patent and Trademark Office*